United States Patent
Watanabe et al.

(10) Patent No.: US 9,547,077 B2
(45) Date of Patent: Jan. 17, 2017

(54) RADAR APPARATUS

(71) Applicant: DENSO CORPORATION, Kariya, Aichi-pref. (JP)

(72) Inventors: Yuu Watanabe, Toyota (JP); Koichiro Suzuki, Yokohama (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 142 days.

(21) Appl. No.: 14/403,926

(22) PCT Filed: May 21, 2013

(86) PCT No.: PCT/JP2013/064030
§ 371 (c)(1),
(2) Date: Nov. 25, 2014

(87) PCT Pub. No.: WO2013/179941
PCT Pub. Date: Dec. 5, 2013

(65) Prior Publication Data
US 2015/0145714 A1 May 28, 2015

(30) Foreign Application Priority Data
May 31, 2012 (JP) .................................. 2012-124895

(51) Int. Cl.
*G01S 13/50* (2006.01)
*G01S 13/38* (2006.01)
(Continued)

(52) U.S. Cl.
CPC ................ *G01S 13/50* (2013.01); *G01S 13/38* (2013.01); *G01S 13/584* (2013.01); *G01S 13/931* (2013.01); *G01S 13/72* (2013.01)

(58) Field of Classification Search
CPC ...... G01S 13/50; G01S 13/931; G01S 13/584; G01S 13/38; G01S 13/72
(Continued)

(56) References Cited

U.S. PATENT DOCUMENTS 6,351,238 B1    2/2002  Kishigami et al.
2008/0042895 A1*  2/2008  Inaba ...................... G01S 13/34
                                                                                     342/112

(Continued)

FOREIGN PATENT DOCUMENTS

JP    2001281316 A    10/2001
JP    2003231460 A    8/2003
(Continued)

OTHER PUBLICATIONS

International Preliminary Report on Patentability and Written Opinion dated Dec. 11, 2014 in corresponding PCT Application No. PCT/JP2013/064030.
(Continued)

*Primary Examiner* — John B Sotomayor
(74) *Attorney, Agent, or Firm* — Harness, Dickey & Pierce, P.L.C.

(57) ABSTRACT

In a dual-frequency CW radar apparatus, first/second beat signals that include reflection components of radar waves conforming to transmission signals of first/second frequencies are generated for each antenna element and the generated signals are Fourier transformed. A power spectrum average of the beat signals is used as a basis for the detection of a peak frequency $f_p$ corresponding to the frequency of the reflection components. A second eigenvalue $\lambda 2$ of a correlation matrix: $Ry=(\frac{1}{2})\cdot[y1,y2][y1,y2]^H$ is calculated, the matrix being based on first received vector y1/second received vector y2 having elements that are Fourier transformed values of the peak frequency $f_p$. Based on the
(Continued)

magnitude of the eigenvalue $\lambda 2$, whether or not the reflection components corresponding to the peak frequency $f_p$ are synthetic components of the reflected waves from a plurality of targets is decided.

7 Claims, 5 Drawing Sheets (51) Int. Cl.
*G01S 13/58* (2006.01)
*G01S 13/93* (2006.01)
*G01S 13/72* (2006.01)

(58) Field of Classification Search
USPC .... 342/107, 108, 70–72; 340/903, 435, 436; 701/301
See application file for complete search history.

(56) References Cited

U.S. PATENT DOCUMENTS

| | | | | |
|---|---|---|---|---|
| 2008/0074307 A1* | 3/2008 | Boric-Lubecke | .... | A61B 5/0205 342/28 |
| 2009/0009381 A1* | 1/2009 | Inaba | ...... | G01S 13/34 342/109 |
| 2009/0073026 A1* | 3/2009 | Nakagawa | ...... | G01S 3/74 342/107 |
| 2009/0079617 A1* | 3/2009 | Shirakawa | ...... | G01S 13/325 342/146 |
| 2009/0309784 A1* | 12/2009 | Natsume | ...... | G01S 13/426 342/189 |
| 2010/0134343 A1* | 6/2010 | Nakagawa | ...... | G01S 3/74 342/147 |
| 2010/0271254 A1* | 10/2010 | Kanamoto | ...... | G01S 3/74 342/27 |
| 2011/0273325 A1* | 11/2011 | Goldman | ...... | G01S 3/46 342/146 |
| 2012/0242535 A1* | 9/2012 | Kanamoto | ...... | G01S 3/74 342/158 |
| 2012/0268313 A1* | 10/2012 | Shimizu | ...... | G01S 7/412 342/107 |
| 2012/0268314 A1* | 10/2012 | Kuwahara | ...... | G01S 3/74 342/147 |
| 2013/0257642 A1* | 10/2013 | Kawabe | ...... | G01S 13/931 342/70 |
| 2013/0321195 A1* | 12/2013 | Moriuchi | ...... | G01S 13/52 342/70 |
| 2014/0028487 A1* | 1/2014 | Ishimori | ...... | G01S 13/06 342/70 |
| 2015/0097718 A1* | 4/2015 | Sato | ...... | G01S 13/34 342/147 |
| 2015/0369911 A1* | 12/2015 | Mabrouk | ...... | G01S 7/415 342/118 |
| 2016/0223651 A1* | 8/2016 | Kamo | ...... | G01S 7/417 |

FOREIGN PATENT DOCUMENTS

| | | | |
|---|---|---|---|
| JP | 2009103566 A | 5/2009 | |
| JP | 2010060459 A | 3/2010 | |
| WO | WO 2013179941 A1 * | 12/2013 | ............ G01S 13/38 |

OTHER PUBLICATIONS

International Search Report (in Japanese with English Translation) for PCT/JP2013/064030, mailed Jul. 9, 2013; ISA/JP.
Written Opinion for PCT/JP2013/064030, mailed Jul. 9, 2013; ISA/JP.

* cited by examiner

RADAR APPARATUS

CROSS REFERENCE TO RELATED APPLICATIONS

This application is a U.S. National Phase Application under 35 U.S.C. 371 of International Application No. PCT/JP2013/064030 filed on May 21, 2013 and published in Japanese as WO 2013/179941 A1 on Dec. 5, 2013. This application is based on and claims the benefit of priority from Japanese Patent Application No. 2012-124895 filed May 31, 2012. The entire disclosures of all of the above applications are incorporated herein by reference.

BACKGROUND OF THE INVENTION

Technical Field

The present disclosure relates to a radar apparatus.

Background Art

Conventionally, as an example of a radar apparatus, a dual-frequency CW (continuous wave) radar apparatus is known. In the dual-frequency CW radar apparatus, two radar waves having different frequencies are emitted. Then, based on the received signals of the reflected waves, the distance to the target that has reflected the radar waves, and the speed and the azimuth of the target are detected.

Patent Literature 1 JP-A-2010-060459

According to this radar apparatus, when a plurality of targets having the same speed are present in the forward direction, the Doppler frequencies of the reflected waves that are generated by these targets may coincide with one another. This leads to the appearance of synthetic components of the reflected waves from the plurality of targets in the received signals (multipath interference conditions). Under these conditions, distances or azimuths are erroneously detected.

In light of such a problem, JP-A-2010-060459 proposes performing judgement for a plurality of times as to whether or not the signal intensity is different between receiver antennas. According to the proposal, if no judgement is made that the signal intensities are different, it is judged that multipath interference is not present. Otherwise, it is judged that multipath interference is present.

In spite of the presence of synthetic components, the signal intensity between the receiver antennas could happen to be the same. According to PTL 1, the judgement as to whether the signal intensity is different is ensured to be performed for a plurality of times at intervals to enhance the accuracy of judgement on the multipath interference conditions.

Synthetic components are generated in received signals only during a very short time. Therefore, according to the patent literature mentioned above, the judgement performed a plurality of times has a limitation in enhancing the accuracy of judgement on the multipath interference conditions. Further, since a judgement has to be made a plurality of times, it takes time before the multipath interference conditions are detected.

SUMMARY

Hence it is desired to provide a technique for enabling a quick and accurate judgement on whether or not the reflection components included in the received signals are synthetic components.

A radar apparatus of the present disclosure is a dual-frequency CW radar apparatus and includes an emitting means, a receiving and outputting means, a transforming means, a peak detecting means, an observing means, an eigenvalue calculating means, a judging means and an inhibiting means.

The emitting means emits radar waves having different frequencies according to a first and second transmission signals. The receiving and outputting means is provided with a plurality of antenna elements capable of receiving reflected waves of the radar waves and outputs, as received signals of each of the plurality of antenna elements, a first received signal including reflection components of a radar wave that conforms to the first transmission signal, and a second received signal including reflection components of a radar wave that conforms to the second transmission signal.

The transforming means generates, for each of the plurality of antenna elements, first frequency data by transforming the first received signal outputted from the receiving and outputting means from a temporospatial signal to frequency-spatial data, and second frequency data by transforming the second received signal outputted from the receiving and outputting means from a temporospatial signal to frequency-spatial data.

The peak detecting means detects a peak frequency corresponding to frequency of the reflection components included in the first and second received signals, on the basis of the first and second frequency data generated by the transforming means. The observing means at least detects a distance to a target that has generated the reflected waves corresponding to the peak frequency, on the basis of phase information of the first and second received signals corresponding to the peak frequency detected by the peak detecting means.

On the other hand, the eigenvalue calculating means calculates a second eigenvalue of a correlation matrix: $Ry = [y1, y2][y1, y2]^H$ that is based on a first received vector y1 having an element of a frequency-spatial value in the peak frequency indicated by the first frequency data corresponding to each of the plurality of antenna elements, and a second received vector y2 having an element of a frequency-spatial value in the peak frequency indicated by the second frequency data corresponding to each of the plurality of antenna elements.

The judging means judges whether or not the reflection components corresponding to the peak frequency are synthetic components of the reflected waves from a plurality of targets, on the basis of the magnitude of the second eigenvalue calculated by the eigenvalue calculating means. The inhibiting means inhibits a distance from being detected by the observing means on the basis of phase information of the first and second received signals corresponding to the peak frequency of which the reflection components have been judged as being the synthetic components by the judging means.

The correlation matrix Ry, which is a matrix configured by two received vectors y1 and y2, is a rank-2 matrix. Thus, the eigenvalues as obtained of the correlation matrix Ry are a first eigenvalue that is the largest and a second eigenvalue that is secondly large. The eigenvalues of a correlation matrix are used for component analysis. As will be understood from this, in the eigenvalues of the correlation matrix Ry used in the present disclosure, if the signal components corresponding to a peak frequency are generated by the reception of a single reflected wave, the second eigenvalue becomes smaller. On the other hand, if the signal components corresponding to the peak frequency are synthetic components generated by the reception of a plurality of independent reflected waves, the received vectors y1 and y2 resultantly include multiple components, and thus the second eigenvalue becomes larger.

According to the present disclosure, the nature of such eigenvalues of the correlation matrix Ry is used to make a highly accurate judgement only once as to whether or not the reflection components corresponding to a peak frequency are synthetic components of the reflected waves from a plurality of targets, without performing a plurality of judgements as in the conventional art.

ADVANTAGEOUS EFFECTS OF THE INVENTION

Thus, according to the present disclosure, a quick and accurate judgement is made as to whether or not the reflection components included in the received signals are synthetic components to thereby provide a high-performance radar apparatus. The judging means may be configured such that the corresponding reflection components are judged as being synthetic components in the case where the second eigenvalue exceeds a predetermined threshold. The receiving and outputting means may be configured such that it outputs, as the first received signal, a first beat signal obtained by mixing the first transmission signal with an input signal from the antenna element, the input signal including the reflection components of the radar wave that conforms to the first transmission signal, and outputs, as the second received signal, a second beat signal obtained by mixing the second transmission signal with an input signal from the antenna element, the input signal including the reflection components of the radar wave that conforms to the second transmission signal.

DETAILED DESCRIPTION OF THE PREFERRED EMBODIMENTS

With reference to the drawings, hereinafter are described some embodiments of the present disclosure.

First Embodiment

Figure 1:
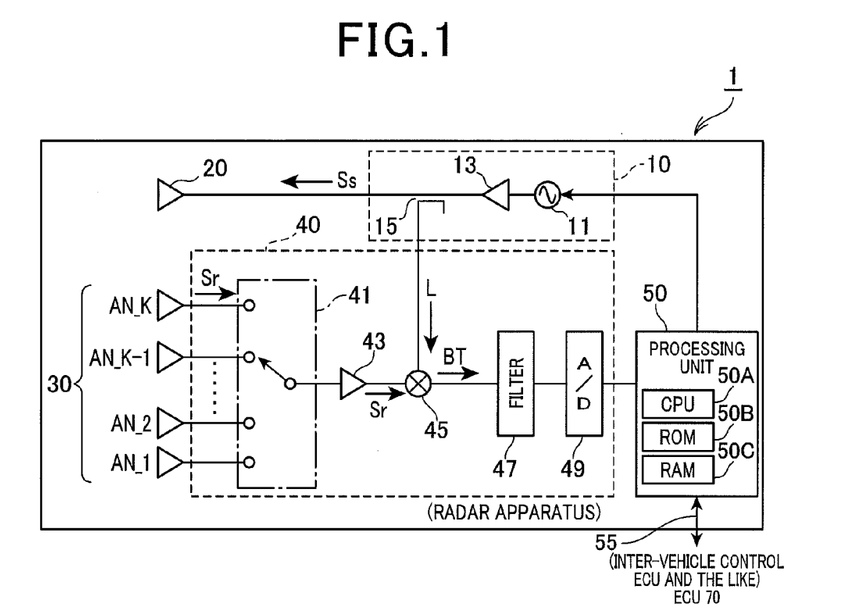
FIG. 1 is a block diagram illustrating a configuration of a radar apparatus 1.

A radar apparatus 1 of the present embodiment is a dual-frequency CW radar apparatus 1 mounted to a vehicle, and includes, as shown in FIG. 1, a transmitter circuit 10, a transmitter antenna 20, a receiver antenna 30, a receiver circuit 40 and a processing unit 50.

The transmitter circuit 10 supplies a transmission signal Ss to the transmitter antenna 20, and includes an oscillator 11, an amplifier 13 and a distributor 15. The oscillator 11 generates high-frequency signals in a millimeter waveband, or alternately generates and outputs, at short intervals, a high-frequency signal of a first frequency (f1) and a high-frequency signal of a second frequency (f2) that is slightly different from the first frequency (f1). The amplifier 13 amplifies the high-frequency signals outputted from the oscillator 11. The distributor 15 distributes the output signals from the amplifier 13 into the transmission signals Ss and local signals L as power distribution.

Figure 2:
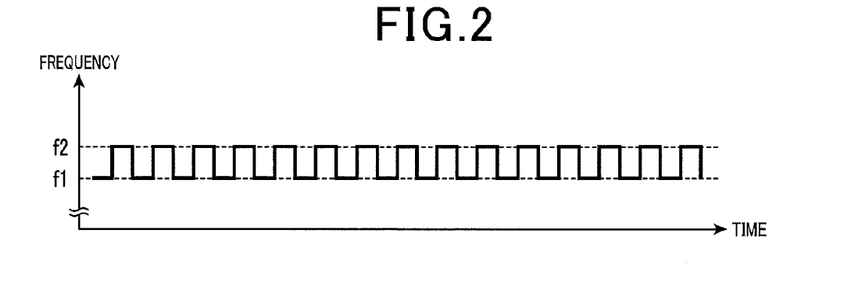
FIG. 2 is a diagram illustrating a mode of switching transmission frequencies f1 and f2.

The transmitter antenna 20 uses, as a basis, the transmission signal Ss supplied from the transmitter circuit 10 to emit a radar wave corresponding to the transmission signal Ss in a direction in which the own vehicle travels. Thus, as shown in FIG. 2, a radar wave of the first frequency (f1) and a radar wave of the second frequency (f2) are alternately outputted.

On the other hand, the receiver antenna 30 is configured to receive radar waves (reflected waves) reflected from a target (forward object), or configured as a linear array antenna in which K antenna elements AN_1 to AN_K are arranged in a row. The receiver circuit 40, which processes input signals Sr from the antenna elements AN_1 to AN_K configuring the receiver antenna 30, includes a receiver switch 41, amplifier 43, mixer 45, filter 47 and A/D converter 49. In the following description, the K antenna elements AN_1 to AN_K are numbered and are each expressed as a $k^{th}$ antenna element AN_k (k=1, 2, . . . and K).

The receiver switch 41 sequentially selects the antenna elements AN_1 to AN_K one by one configuring the receiver antenna 30, and selectively transmits the input signal Sr from the selected $k^{th}$ antenna element AN_k to the amplifier 43. Specifically, every time the frequency of the transmission signal Ss outputted from the transmitter circuit 10 is switched from f1 to f2 or vice versa, the receiver switch 41 makes a series of selection of the antenna elements AN_1 to AN_K for a predetermined number of times. The amplifier 43 amplifies the input signal Sr which is sent from the $k^{th}$ antenna element AN_k via the receiver switch 41 to supply the amplified signal downstream.

The mixer 45 mixes the input signal Sr from the amplifier 43 with the local signal L to generate a beat signal BT. The filter 47 removes unnecessary signal components from the beat signal BT outputted from the mixer 45. The output signals from the filter 47 are sampled by the A/D converter 49 for conversion into digital data, and the digital data are inputted to the processing unit 50. In addition, the A/D converter 49 performs data sampling in synchrony with the switching timing of the receiver switch 41.

The processing unit 50 includes CPU 50A, ROM 50B and RAM 50C. In the processing unit 50, the CPU 50A carries out processes in accordance with programs stored in the ROM 50B to realize, for example, signal analysis and control over various components of the apparatus.

Specifically, the processing unit 50 controls the transmitter circuit 10 and the receiver circuit 40 to alternately emit radar waves of the first frequency (f1) and the second frequency (f2) from the transmitter antenna 20. The processing unit 50 ensures that the beat signals BT of the antenna elements AN_1 to AN_K, which include the reflection components of the radar waves, are sampled in the receiver circuit 40. Then, the processing unit 50 analyzes the sampling data of the beat signals BT for each of the antenna elements and transmits target information obtained through the analysis to an in-vehicle electronic control unit (ECU) via a communication interface 55 (communicating means). The target information includes, for example, the distance R to a target that has reflected the radar waves, a relative speed V of the target relative to the own vehicle, and an azimuth θ of the target relative to the travel direction of the own vehicle. For example, the radar apparatus 1 provides the target information to an ECU 70 (control means) that carries out inter-vehicle control.

Figure 3:
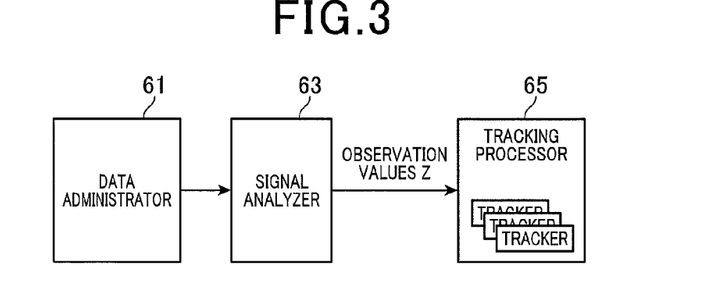
FIG. 3 is a functional block diagram illustrating a processing unit 50.

Referring now to FIG. 3, hereinafter are described functions which are realized by the processing unit 50. The processing unit 50 functions as a data administrator 61, a signal analyzer 63 and a tracking processor 65 with the execution of the programs by the CPU 50A.

The data administrator 61 performs a process of separating the digital data of the sampled beat signals BT, which are inputted from the A/D converter 49, into sampling data, for each of first and second beat signals and for each of the antenna elements to store the separated data in the RAM 50C.

The first beat signal here refers to a beat signal BT which is generated by the mixer 45 in mixing the input signal Sr with the local signal L of the first frequency (f1). The second beat signal refers to a beat signal BT which is generated by the mixer 45 in mixing the input signal Sr with the local signal L of the second frequency (f2). Since the time taken for the transmission and reception of the radar waves is very short, the first beat signal includes the reflection components of the radar wave of the first frequency (f1), and the second beat signal includes the reflection components of the radar wave of the second frequency (f2).

The signal analyzer 63 carries out a signal analysis on the basis of the sampling data for each of the first and second beat signals and for each of the antenna elements, which sampling data are obtained from the data administrator 61. As a result of the signal analysis, the signal analyzer 63 detects, as observation values Z, the distance R to a target, the relative speed V of the target relative to the own vehicle, and the azimuth θ of the target relative to the travel direction of the own vehicle.

The tracking processor 65 estimates (predicts) a motion state of the target on the basis of the observation values Z obtained from the signal analyzer 63. Specifically, the tracking processor 65 estimates (predicts) a motion state of each target, that is an object to be tracked, using a well known tracker. The tracker may include a tracker using a Kalman filter, or an α-β tracker.

In the tracking processor 65, the observation values Z of one target obtained from the signal analyzer 63 are allocated to one tracker. Then, the tracker estimates, as the motion state of the target, the distance R to the target, the relative speed V of the target relative to the own vehicle, and the azimuth 8 of the target relative to the travel direction of the own vehicle of the present time and in the future on the basis of the observation values Z.

Figure 4:
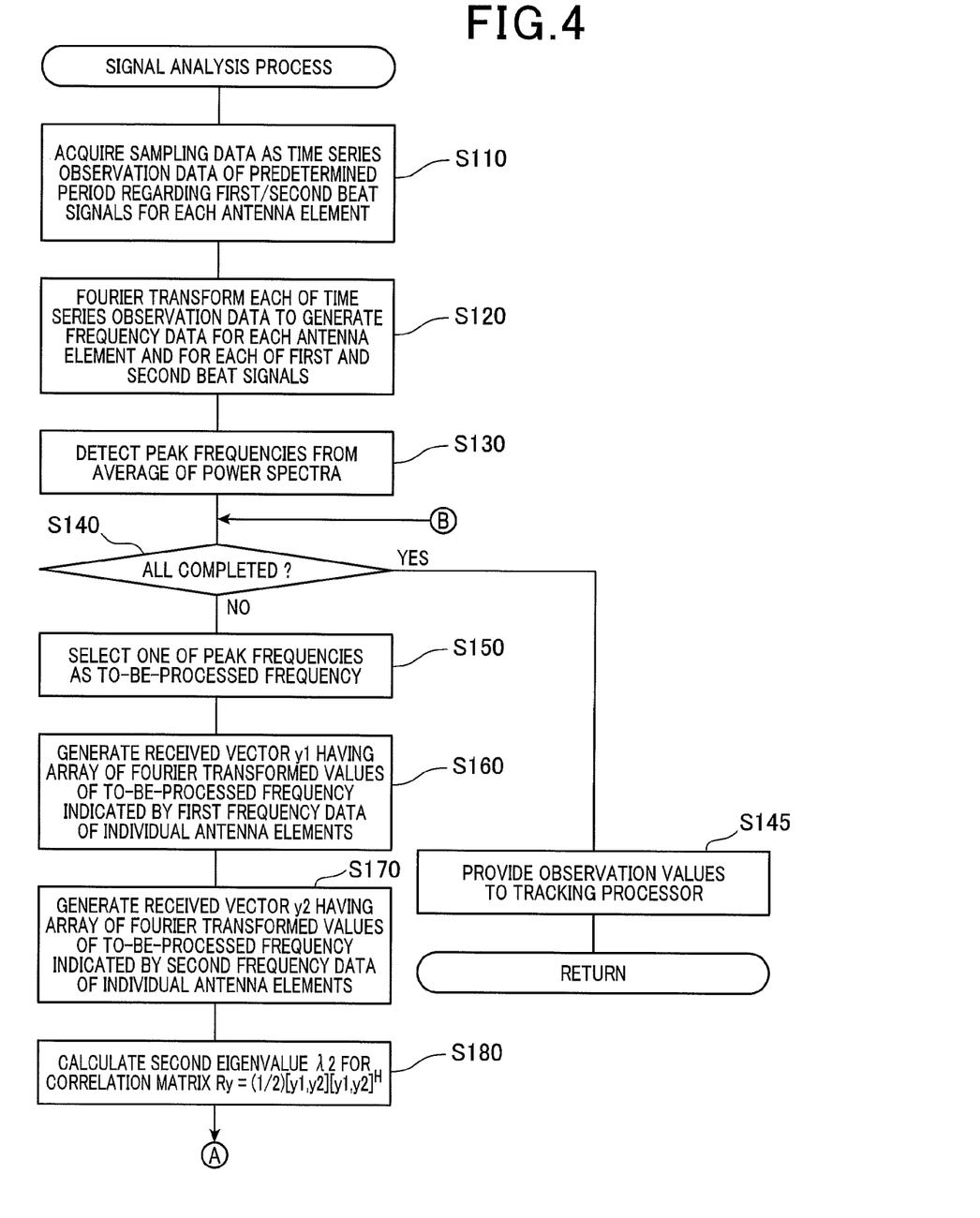
FIG. 4 is a flow chart illustrating a signal analysis process performed by the processing unit 50.
Figure 5:
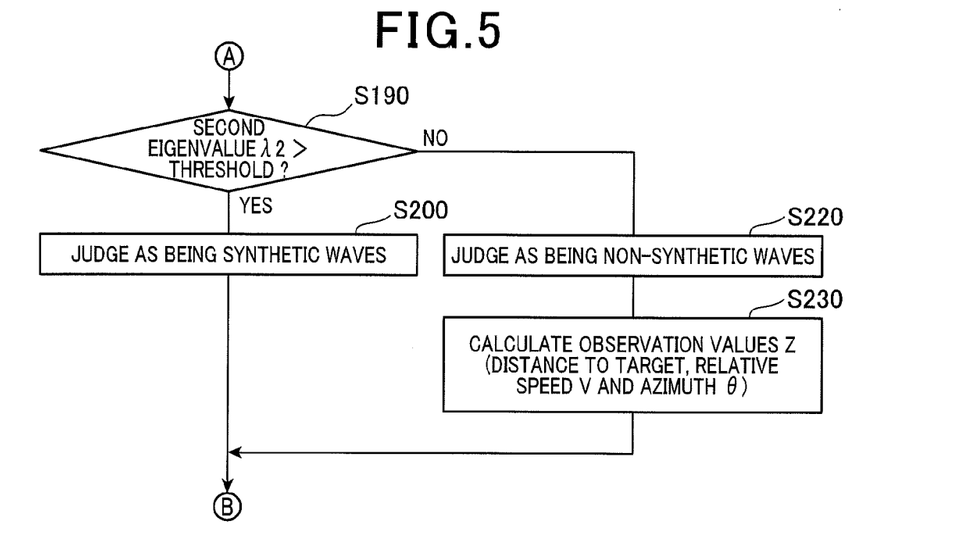
FIG. 5 is a flow chart illustrating the signal analysis process performed by the processing unit 50.

Referring to FIGS. 4 and 5, a signal analysis process performed by the processing unit 50 is described. The processing unit 50 periodically and repeatedly performs the signal analysis process. By performing the signal analysis process, the processing unit 50 functions as the signal analyzer 63.

Upon start of the signal analysis process, the processing unit 50 firstly reads and acquires time series observation data from the RAM 60C for each antenna element (S110). The time series observation data correspond to the sampling data of a predetermined period for the first/second beat signals based on the input signals Sr that are acquired from each antenna element, or from the antenna element AN_k. In other words, the processing unit 50 acquires the time series observation data for each of the first and second beat signals and for each of the antenna elements AN_1 to AN_K.

Then, the processing unit 50 operates to Fourier transform the time series observation data for each antenna element and for each of the first and second beat signals, from temporospatial data to frequency-spatial data (S120). In the following description, the data that are obtained by Fourier transforming the time series observation data for the first beat signal are referred to as first frequency data, and the data that are obtained by Fourier transforming the time series observation data for the second beat signal are referred to as second frequency data. The first frequency data and the second frequency data include Fourier transformed values that are obtained by Fourier transforming the respective time series observation data. Hereinafter, a Fourier transformed value of each frequency f, which is obtained by Fourier transforming the time series observation data for an $m^{th}$ beat signal (m=1, 2) of the $k^{th}$ antenna element is expressed as $X_{km}[j2\pi f]$. The symbol j is an imaginary symbol.

After completing the step of S120, the processing unit 50 calculates an average $P[j2\pi f]$ of power spectra of the first beat signals of the individual antenna elements and power spectra of the second beat signals of the individual antenna elements, the power spectra being specified by the first and second frequency data, respectively, of the individual antenna elements.

$$P[j2\pi f] = \frac{1}{2K} \sum_{k=1}^{K} \sum_{m=1}^{2} |X_{km}[j2\pi f]|^2 \qquad \text{Formula 1}$$

Then, based on the average $P[j2\pi f]$ of the power spectra, a peak frequency $f_p$ is detected (S130). The peak frequency $f_p$ is detected as a frequency that has a peak (maximum) at which the power $P[j2\pi f]$ indicates a value of not less than a predetermined threshold Th1 in the averaged power spectrum. If there are a plurality of frequencies that meet the above requirement, the individual frequencies are detected as the peak frequencies $f_p$.

The threshold Th1 used for detecting the peak frequency $f_p$ is determined at a design stage so that the peak frequency $f_p$ detected from the power spectrum will have a sufficiently high probability of being a Doppler frequency that is a frequency of the reflected waves of the radar waves. It should be noted that the radar waves of the first and second beat signals, respectively, have transmission frequencies different from each other. Accordingly, precisely, there is a small difference between the Doppler frequency in the first beat signal and the Doppler frequency in the second beat signal. However, as is known, in the dual-frequency CW method, the frequency difference is only slight between the first and second frequencies f1 and f2.

Therefore, at S130, the Doppler frequencies are regarded as being the same and thus the peak frequency $f_p$ is detected from the averaged power spectrum.

When the step of S130 is completed, the processing unit 50 selects all of the detected peak frequencies $f_p$ as being to-be-processed frequencies $f_p$ to determine whether or not the steps on and after S150 have been performed for them. If the determination is negative (No at S140), control proceeds to S150 where, of the peak frequencies $f_p$ detected at S130, one of the unselected frequencies is selected as being a to-be-processed frequency $f_p$ (S150).

After that, the processing unit 50 generates a received vector y1 on the basis of Formula 2 below (S160). The received vector y1 includes an array of Fourier transformed values $X_{k1}[j2\pi f_v]$ of the to-be-processed frequency $f_v$, which are indicated by the first frequency data of the individual antenna elements.

$$y1 = [X_{11}[j2\pi f_v] \cdot X_{21}[j2\pi f_v], \ldots, X_{K1}[j2\pi f_v]]^T \quad \text{Formula 2}$$

In Formula 2, T is a transposition symbol. Similarly, the processing unit 50 generates a received vector y2 on the basis of Formula 3 below (S170). The received vector y2 includes an array of Fourier transformed values $X_{k2}[j2\pi f_v]$ in the to-be-processed frequency $f_v$, which are indicated by the second frequency data of the individual antenna elements.

$$y2 = [X_{12}[j2\pi f_v] \cdot X_{22}[j2\pi f_v], \ldots, X_{K2}[j2\pi f_v]]^T \quad \text{Formula 3}$$

After that, the processing unit 50 calculates a second eigenvalue λ2 with respect to a correlation matrix $R_y$ (S180).

$$R_y = \frac{1}{2}(y1 y1^H + y2 y2^H) = \quad \text{Formula 4}$$

$$\frac{1}{2}[y1, y2][y1, y2]^H = [u1, u2]\begin{bmatrix} \lambda 1 & 0 \\ 0 & \lambda 2 \end{bmatrix}[u1, u2]^2$$

In Formula 4, a symbol H is a conjugate transposition symbol. The correlation matrix $R_y$ is a matrix having two received vectors y1 and y2 as components and thus is a rank-2 matrix. Accordingly, the correlation matrix $R_y$ can be expressed, as indicated on the right-hand side in the above formula, by a first eigenvalue λ1 and the second eigenvalue λ2, and their eigenvectors u1 and u2. As is known, the first eigenvalue λ1 here refers to an eigenvalue having a largest value in the eigenvalues λ1 and λ2 of the correlation matrix $R_y$. Further, the second eigenvalue λ2 is a second largest eigenvalue. At S180, the second eigenvalue λ2 with respect to the correlation matrix $R_y$ is calculated.

The second eigenvalue λ2 will have a small value if the signal components corresponding to the to-be-processed frequency (peak frequency) $f_v$ are the reflection components from a single target. The second eigenvalue λ2 will have a large value if the signal components corresponding to the peak frequency $f_v$ are synthetic components containing the reflection components from a plurality of independent targets and if the received vectors y1 and y2 include these synthetic components (multiple components).

Accordingly, at the subsequent S190, it is determined whether or not the second eigenvalue λ2 calculated at S180 is larger than a threshold Th2 predetermined at a design stage. If the second eigenvalue λ2 is determined to be larger than the threshold Th2 (Yes at S190), the signal components corresponding to the to-be-processed frequency $f_v$ are judged to be synthetic components (S200). If the second eigenvalue λ2 is determined to be equal to or less than the threshold Th2 (No at S190), the signal components corresponding to the to-be-processed frequency $f_v$ are judged not to be synthetic components (S220).

Further, if the signal components corresponding to the to-be-processed frequency $f_v$ are judged not to be synthetic components, the processing unit 50 calculates, at the subsequent S230, the distance R to the target, the relative speed V of the target relative to the own vehicle and the azimuth θ of the target relative to the own vehicle, as the observation values Z of the target that has generated the reflected waves corresponding to the to-be-processed frequency $f_v$.

The methods of calculating these observation values Z are well known and therefore are described only briefly. The relative speed V of the target relative to the own vehicle can be calculated from the information on the to-be-processed frequency $f_v$ that is a Doppler frequency. For example, the relative value V can be calculated according to a formula: V=($f_v$/2)·(C/f1)≈($f_v$/2)·(C/f2), where C is a propagation speed of the radar waves. Since the value (C/f1) and the value (C/f2) are substantially the same, the relative speed V can be calculated on the basis of either of the transmission frequencies f1 and f2. However, an average of the relative speeds V calculated using the transmission frequencies f1 and f2 may be used as the relative speed V of the target.

Figure 6:
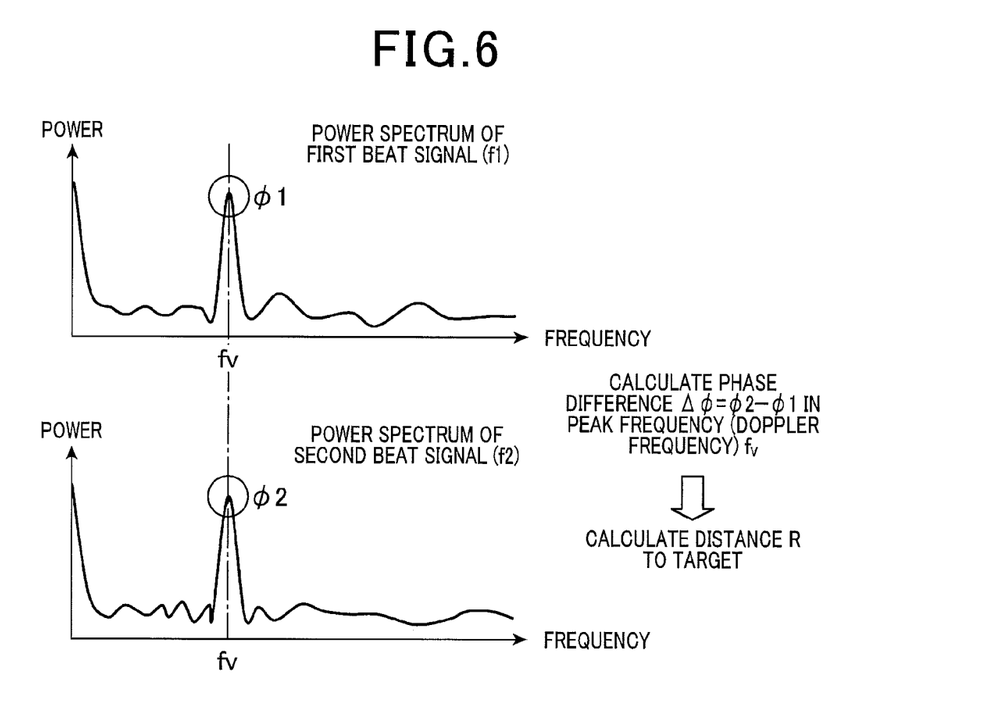
FIG. 6 is an explanatory diagram associated with a method of calculating a distance R to a target.

The distance R to the target can be specified from phase information on the reflection components of the to-be-processed frequency $f_v$. For example, as shown in FIG. 6, the reflection components of the to-be-processed frequency $f_v$ in the first beat signal have a phase φ1, while the reflection components of the to-be-processed frequency $f_v$ in the second beat signal have a phase φ2. Using a phase difference Δφ=φ2−φ1, the distance R to the target can be calculated according to a formula: R=C·Δφ/4π·(f2−f1). The phase difference Δφ may be calculated on the basis of the beat signal of one antenna element AN_k, or may be calculated as an average of the K antenna elements AN_1 to AN_K. The azimuth θ of the target can be calculated on the basis of a phase difference between the antenna elements, which is indicated by the first and second beat signals.

If the signal components corresponding to the to-be-processed frequency $f_v$ are judged not to be synthetic components (S220), the observation values Z of the target that has generated the reflected waves corresponding to the to-be-processed frequency $f_v$ are calculated as described above (S230), and then control proceeds to S140. If the signal components corresponding to the to-be-processed frequency $f_v$ are judged to be synthetic components (S200), the observation values Z are not calculated, but the reflection components of the to-be-processed frequency $f_v$ are dealt as not having been observed, and then control proceeds to S140.

The reason why the observation values Z are not calculated if the signal components corresponding to the to-be-processed frequency $f_v$ are judged to be synthetic components lies in that calculating the distance R to the target on the basis of these signal components may cause a large error in the distance R.

Figure 7:
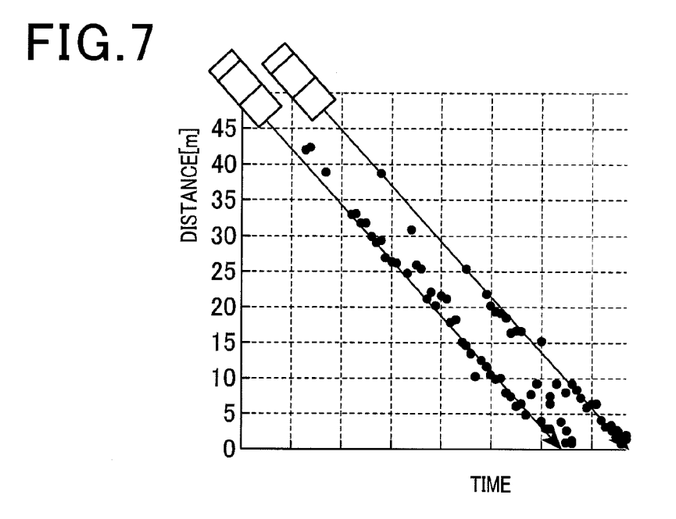
FIG. 7 is a diagram plotting the results of the calculation of the distance R under the conditions that there are two forward vehicles running at the same speed.

FIG. 7 shows a situation in which there are two forward vehicles that travel at the same speed in different azimuths as viewed from the own vehicle, and shows the results of calculating the distance R up to the forward vehicles. In FIG. 7, the horizontal axis indicates time and the vertical axis indicates distance to the forward vehicles. The plots in FIG. 7 each indicate the distance R resulting from the calculations performed by the dual-frequency CW radar apparatus in the case where the forward vehicles travel at a constant speed along the respective trajectories indicated by the solid lines. In addition, the plots each indicate the distance R which is calculated irrespective of the results of the judgement as to synthetic waves.

According to the example shown in FIG. 7, in a situation where the forward vehicles are distanced from the own vehicle, synthetic components are unlikely to be generated and thus the distance R can be calculated as a value close to a true value (solid lines). However, as will be understood from the figure, as the forward vehicles approach the own vehicle, synthetic components become prominent and thus, the calculation values of the distance R each correspond to an intermediate value of the two forward vehicles.

Thus, calculation of the distance R on the basis of synthetic components leads to calculation of the distance R up to an intermediate point with respect to the reflection sources of the reflected waves which form the synthetic components. Therefore, according to the present embodiment, if the signal components corresponding to the to-be-processed frequency $f_v$ are judged to be synthetic components, the observation values Z are not calculated. However, the relative speed V, which can be highly accurately calculated irrespective of the reflection components' being synthetic components, may be calculated. This is discussed in a second embodiment.

In the signal analysis process of the present embodiment, each peak frequency $f_p$ detected at step S130 is judged in this way as to whether or not the reflection components corresponding to the frequency are synthetic components. Then, if the reflection components are not synthetic components, the observation values Z are calculated (S140 to S230).

Then, when all of the peak frequencies $f_p$ detected at S130 are selected to be the to-be-processed frequencies $f_v$, and the steps on and after S150 are determined to have been performed (Yes at S140), the observation values Z for each peak frequency $f_p$ (or each observation point) are provided as tasks to the processing unit 50 that realizes the functions as the tracking processor 65 (S145). Then, the signal analysis process is terminated. The tracking processor 65 allocates the observation values Z to the tracker of the corresponding target by means of a predetermine algorithm to estimate the motion state of the target.

According to the radar apparatus 1 of the present embodiment described so far, the radar waves having different frequencies are emitted from the transmitter antenna 20 in accordance with the transmission signals Ss of the first and second frequencies (f1) and (f2) alternately outputted from the transmitter circuit 10. Then, the reflected waves of the radar waves are received by the receiver antenna 30 having the antenna elements AN_1 to AN_K. Then, the receiver circuit 40 generates first/second beat signals that are the mixture of the local signal L of the first/second frequencies with the input signal of each antenna element, which includes the reflection components of the radar waves conforming to the transmission signals Ss of the first/second frequencies.

For each antenna element, the processing unit 50 Fourier transforms the sampling data of a predetermined period of the first/second beat signals outputted from the receiver circuit 40. Through the Fourier transformation, the processing unit 50 transforms the sampling data of the predetermined period from temporospatial data to frequency-spatial data and generates the first/second frequency data.

Further, the processing unit 50 detects the peak frequencies $f_p$, which are the frequencies of the reflection components contained in the first and second beat signals, from an average of the power spectra specified by the first and second frequencies of the individual antenna elements. Then, based on the phase information of the first and second beat signals corresponding to a peak frequency $f_p$, the processing unit 50 calculates the distance R to the target and the azimuth θ of the target, as the observation values Z of the target which has generated the reflected waves corresponding to the peak frequency $f_p$. Further, the processing unit 50 calculates the relative speed V of the target relative to the own vehicle on the basis of the peak frequency $f_p$.

On the other hand, prior to the calculation of the observation values Z, the processing unit 50 calculates the second eigenvalue λ2 of the correlation matrix Ry=(½)·[y1, y2][y1, y2]$^H$ that is based on the received vectors y1 and y2 mentioned above. Then, the processing unit 50 judges whether or not the reflection components corresponding to the peak frequency $f_p$ are synthetic components of the reflected waves from a plurality of targets, on the basis of the magnitude of the second eigenvalue λ2, using the threshold Th2 as an index. Then, the processing unit 50 inhibits calculation of the distance R based on the phase information of the first and second beat signals corresponding to the peak frequency $f_p$, which have been judged as being synthetic components.

According to the present embodiment, the second eigenvalue λ2 of the correlation matrix Ry is used to make a highly accurate judgement only once as to whether or not the reflection components corresponding to a peak frequency $f_p$ are synthetic components of the reflected waves from a plurality of targets, without performing a plurality of judgements at intervals as in the conventional art. Accordingly, according to the present embodiment, a quick and accurate judgement can be made as to whether or not the reflection components corresponding to the peak frequency $f_p$ are synthetic components. Thus, the dual-frequency CW radar apparatus 1 having high performance can be provided.

Additionally, as described above, a judgement is made as to whether or not the reflection components corresponding to a peak frequency $f_p$ are synthetic components, on the basis of the second eigenvalue λ2 of the correlation matrix Ry= (½)·[y1, y2][y1, y2]$^H$. This judgement can be made with high accuracy when the synthetic components are the reflection components from a plurality of targets that are located at different distances R and azimuths θ.

Figure 8:
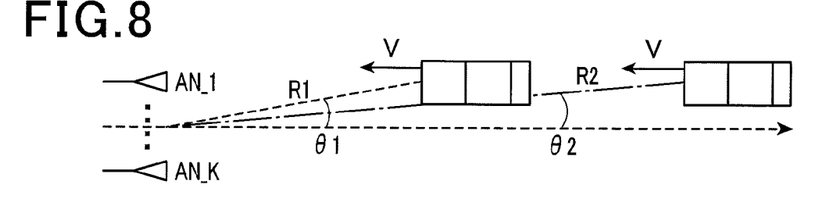
FIG. 8 is a diagram illustrating distances R1 and R2, and azimuths θ1 and θ2 of the forward vehicles.

Let us discuss a situation, as shown in FIG. 8, where a first target (forward vehicle) is present in the forward direction at a distance R1 and an azimuth θ1 relative to the own vehicle, and a second target (forward vehicle) is present in the forward direction at a distance R2 and an azimuth θ2 relative to the own vehicle. In this situation, the following formulas can approximate a received signal $x_{km}(t)$ of a $k^{th}$ antenna element, which includes the reflection components of an $m^{th}$ frequency (m=1, 2), and can approximate a Fourier transformed value $X_{km}(j2\pi f_d)$ at a Doppler frequency $f_d$ of the received signal.

$$x_{km}(t) = \sum_{i=1}^{2} A_i \exp(j2\pi f_d t + j\phi_{im})a_{ki} \qquad \text{Formula 5}$$

$$X_{km}(j2\pi f_d) = \sum_{i=1}^{2} A_i \exp(j\phi_{im})a_{ki}$$

In the formulas, a variable $\phi_{im}$ is phase information of an $i^{th}$ target (i=1, 2) in the reflection components of a radar wave having the $m^{th}$ frequency and is formulated as $\phi_{im}=4\pi Ri \cdot fm/C+\phi 0$. In the formulas, φ0 is an initial phase and $A_i$ is an amplitude of the reflection components of the $i^{th}$ target. Besides, fm is the $m^{th}$ frequency, C is a propagation speed of the radar wave, and $a_{ki}$ is an array response at an azimuth $\theta_i$ in the $k^{th}$ antenna element.

Accordingly, the received vectors y1 and y2 can be expressed by the following formulas.

$$y1(j2\pi f_d) = A_1 e^{j\phi 11}a_1 + A_2 e^{j\phi 21}a_2 = e^{j\phi 11}(A_1 a_1 + A_2 e^{j(\phi 21-\phi 11)}a_2)$$

$$y2(j2\pi f_d) = A_1 e^{j\phi 12}a_1 + A_2 e^{j\phi 22}a_2 = e^{j\phi 12}(A_1 a_1 + A_2 e^{j(\phi 22-\phi 12)}a_2)$$

$$a_i = [a_{1i}, a_{2i}, \ldots, a_{Ki}] \qquad \text{Formula 6}$$

The boldface $a_i$ is an array response vector at an azimuth $\theta_i$ (i=1, 2).

In order to judge whether or not the reflection components are the synthetic components on the basis of the second eigenvalue $\lambda 2$ of the correlation matrix Ry, the received vectors y1 and y2 are required to be independent. However, when the azimuths $\theta 1$ and $\theta 2$ of the two targets coincide with each other, the array response vectors $a_1$ and $a_2$ naturally coincide with each other, and thus it is apparent that an independent relationship is not established between the received vectors y1 and y2.

On the other hand, on condition that the azimuths are different from each other but that $(\phi 21-\phi 11)-(\phi 22-\phi 12)=4\pi (R2-R1)\cdot(f1-f2)/C$ is an integral multiple of $2\pi$, an independent relationship is still not established between the received vectors y1 and y2. In view of the design of the radar apparatus 1, the value of the above formula does not become $2\pi$ or more. Accordingly, if R2−R1=1, i.e. the distances R1 and R2 of the two targets are the same, no independent relationship is established between the received vectors y1 and y2.

To conclude, the judgement as to whether or not the reflection components are synthetic components on the basis of the second eigenvalue $\lambda 2$ of $Ry=(½)\cdot[y1, y2][y1,y2]^H$ can be made with high accuracy when the synthetic components are of the reflection waves derived from different distances and azimuths.

Second Embodiment

As mentioned above, the relative speed V of a target can be highly accurately calculated if the reflection components are synthetic components. The second embodiment describes an example in which the relative speed V is calculated regardless of the reflection components' being synthetic components and the relative speed V is utilized. However, in a radar apparatus 1 of the second embodiment, a process performed by a processing unit 50 is only partially different from the foregoing embodiment. Accordingly, differences from the foregoing embodiment are selectively described as a configuration of the radar apparatus 1 of the second embodiment. It should be noted that, for simplicity's sake in the second embodiment, description is given by way of an example in which the distance R to a target and the relative speed V of the target relative to the own vehicle are dealt with in a primary coordinate system.

Figure 9:
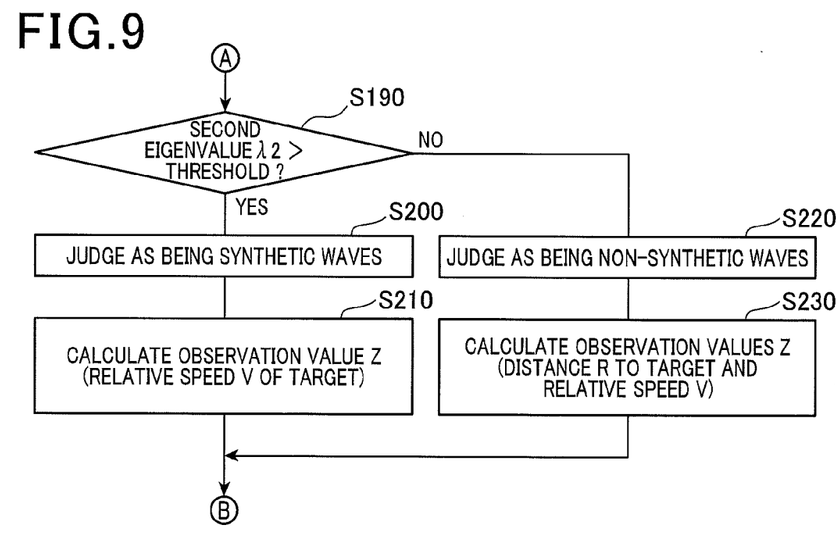
FIG. 9 is a flow chart illustrating a signal analysis process according to a second embodiment.

According to the second embodiment, the processing unit 50 performs a signal analysis process shown in FIGS. 4 and 9. If the processing unit 50 judges that the signal components corresponding to a to-be-processed frequency $f_v$ are not synthetic components (S220), control proceeds to the subsequent S230. At S230, the processing unit 50 calculates the distance R to a target and the relative speed V of the target relative to the own vehicle, as the observation values Z of the target that has generated the reflected waves corresponding to the to-be-processed frequency $f_v$.

On the other hand, if the processing unit 50 judges that the signal components corresponding to the to-be-processed frequency $f_v$ are synthetic components (S200), control proceeds to the subsequent S210. At S210, the processing unit 50 calculates the relative speed V of the target relative to the own vehicle, as an observation value Z of the target that has generated the reflected waves corresponding to the to-be-processed frequency $f_v$.

Then, at S145, together with the judgement results as to synthetic components, the observation value Z of each observation point is provided as tasks to the processing unit 50 to realize the function as the tracking processor 65.

Figure 10:
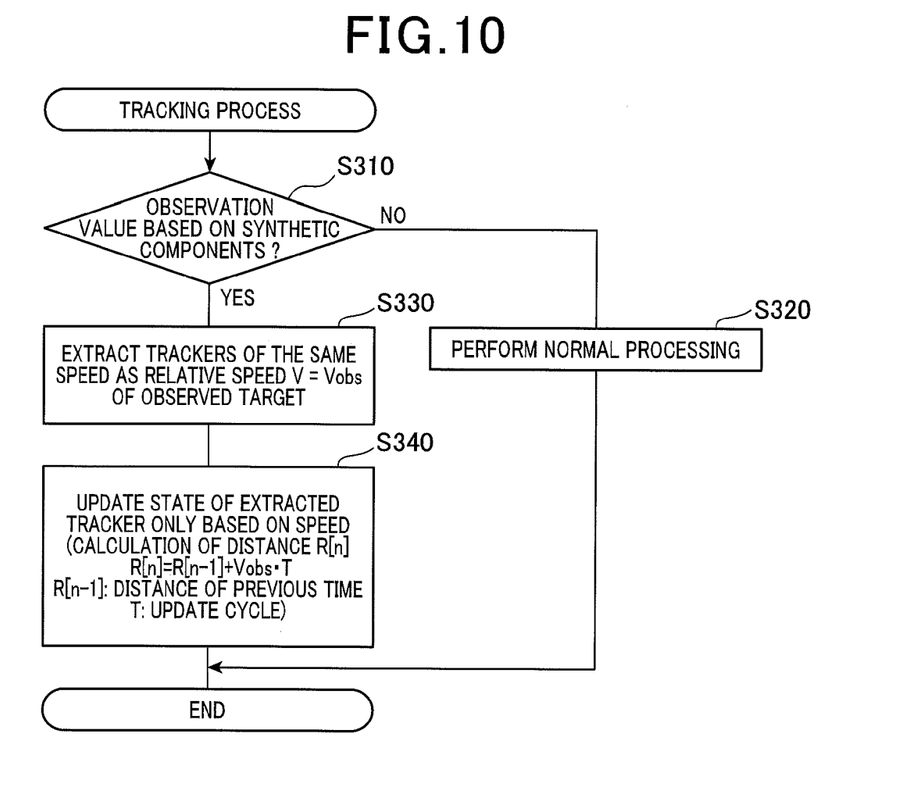
FIG. 10 is a flow chart illustrating a tracking process performed by a processing unit 50 in the second embodiment.

On the other hand, the processing unit 50 performs a tracking process shown in FIG. 10 for the observation value Z of each observation point, which is provided through the signal analysis process to thereby realize a function as the tracking processor 65 of the present embodiment.

Upon start of the tracking process, the processing unit 50 determines whether or not the provided observation value Z is based on synthetic components (S310). In other words, the processing unit 50 determines whether or not the signal components based on which the observation value Z has been calculated are the ones that have been judged as corresponding to synthetic components. This determination is made on the basis of the information on the judgement results which are provided together with the observation value Z.

If it is determined that the observation value Z is not based on synthetic components (No at S310), the processing unit 50 carries out a normal process and allocates the observation value Z to the corresponding tracker of the target using a predetermined algorithm. Thus, similar to the first embodiment, the processing unit 50 estimates the motion state of the target. The processing unit 50 estimates, as the motion state, the distances R to the target and the relative speeds V of the target relative to the own vehicle of the present time and in the future on the basis of the observation value Z. The estimation is made in a primary coordinate system based on the own vehicle (S320).

On the other hand, if the observation value Z is determined to be based on synthetic components (Yes at S310), the processing unit 50 refers to the relative speed V of the target at the present time predicted by each tracker. Then, the processing unit 50 extracts, from a group of trackers, one or more trackers that predict the same speed as the relative speed V of the target, which has been obtained as the observation value Z this time (S330). However, the same speed referred to here is a speed that falls in a predetermined error range centering on the relative speed V of the target obtained as the observation value Z.

After that, the processing unit 50 uses the following method for updating the estimated values (the distances R to the target and the relative speeds V of the target) for the motion state of the target in each extracted tracker, on the basis of the relative speed V=Vobs of the target obtained this time as the observation value Z.

Specifically, the processing unit 50 estimates a distance R[n] of the target as an estimated value for the motion state of the target at a present time n. The estimation is made based on a distance R[n−1] at a previous time (n−1), the relative speed V=Vobs of the target obtained this time as the observation value Z, and an update cycle T of the estimated values of each tracker, according to a formula: R[n]=R[n−1]+Vobs·T. The distance R[n−1] may be the estimated value of the distance R of the previous time, or may be the observation value of the distance R of the previous time. The relative speed V[n] of the present time n can be estimated to be the relative speed V=Vobs of the observed target. After performing update in this way, the processing unit 50 terminates the tracking process.

The radar apparatus 1 of the second embodiment inhibits the distance R from being calculated as an observation value Z, on the basis of the reflection components that have been judged to be synthetic components, but calculates the relative speed V for utilization in estimating the state of the target. Thus, the radar apparatus 1 having high performance can be provided.

Some embodiments of the present disclosure have so far been described. However, the radar apparatus of the present disclosure should not be construed as being limited to the foregoing embodiments but may be implemented in various modes. For example, the present disclosure may also be applied to a radar apparatus for use other than the in-vehicle use.

The correspondency between terms is as follows. Specifically, the transmitter circuit 10 and the transmitter antenna 20 correspond to an example of the emitting means, the receiver antenna 30 and the receiver circuit 40 correspond to an example of the receiver output circuit, and the function realized at S120 which is performed by the processing unit 50 corresponds to an example of the function realized by the transforming means.

Further, the function realized at S130 corresponds to an example of the function realized by the peak detecting means, the function realized at S210 and S230 corresponds to an example of the function realized by the observing means, the function realized at S160 to S180 corresponds to an example of the function realized by the eigenvalue calculating means, and the function realized at S190 corresponds to an example of the function realized by the judging means.

Besides, the function realized by the operation of selecting the branches to S200 and S210 if an affirmative determination is made at S190 corresponds to an example of the function realized by the inhibiting means. Further, the function realized at S330 and S340 which are performed by the processing unit 50 corresponds to an example of the function realized by the distance estimating means.

REFERENCE SIGNS LIST

1 . . . Radar apparatus, 10 . . . Transmitter circuit, 11 . . . Oscillator, 13 . . . Amplifier, 15 . . . Distributor, 20 . . . Transmitter antenna, 30 . . . Receiver antenna, 40 . . . Receiver circuit, 41 . . . Receiver switch, 43 . . . Amplifier, 45 . . . Mixer, 47 . . . Filter, 49 . . . A/D converter, 50 . . . Processing unit, 50A . . . CPU, 50B . . . ROM, 50C . . . RAM, 55 . . . Communication interface, 61 . . . Data administrator, 63 . . . Signal analyzer, 65 . . . Tracking processor, AN_1 to AN_K . . . Antenna elements, and 70 . . . Inter-vehicle control ECU

What is claimed is:

1. A dual-frequency CW radar apparatus comprising:
emitting means that emits radar waves of different frequencies according to a first and second transmission signals having the different frequencies;
receiving and outputting means that is provided with a plurality of antenna elements capable of receiving reflected waves of the radar waves and outputs, as received signals of each of the plurality of antenna elements, a first received signal including reflection components of a radar wave that conforms to the first transmission signal, and a second received signal including reflection components of the radar wave that conforms to the second transmission signal;
transforming means that generates, for each of the plurality of antenna elements, first frequency data by transforming the first received signal outputted from the receiving and outputting means from a temporospatial signal to frequency-spatial data, and second frequency data by transforming the second received signal outputted from the receiving and outputting means from a temporospatial signal to frequency-spatial data;
peak detecting means that detects a peak frequency corresponding to a frequency of the reflection components included in the first and second received signals, on the basis of the first and second frequency data generated by the transforming means;
observing means that at least detects a distance to a target that has generated the reflected waves corresponding to the peak frequency, on the basis of phase information of the first and second received signals corresponding to the peak frequency detected by the peak detecting means;
eigenvalue calculating means that calculates a second eigenvalue of a correlation matrix: Ry=[y1,y2][y1,y2]$^H$ that is based on a first received vector y1 having an element of a frequency-spatial value in the peak frequency indicated by the first frequency data corresponding to each of the plurality of antenna elements, and a second received vector y2 having an element of a frequency-spatial value in the peak frequency indicated by the second frequency data corresponding to each of the plurality of antenna elements;
judging means that judges whether or not the reflection components corresponding to the peak frequency are synthetic components of the reflected waves from a plurality of targets, on the basis of the magnitude of the second eigenvalue calculated by the eigenvalue calculating means; and
inhibiting means that inhibits a distance from being detected by the observing means on the basis of phase information of the first and second received signals corresponding to the peak frequency of which the reflection components have been judged as being the synthetic components by the judging means.

2. The radar apparatus according to claim 1, wherein the judging means judges that the reflection components corresponding to the peak frequency are the synthetic components when the second eigenvalue exceeds a predetermined threshold.

3. The radar apparatus according to claim 1, wherein the receiving and outputting means outputs, as the first received signal, a first beat signal obtained by mixing the first transmission signal with an input signal from the antenna element, the input signal including the reflection components of the radar wave that conforms to the first transmission signal, and outputs, as the second received signal, a second beat signal obtained by mixing the second transmission signal with an input signal from the antenna element, the input signal including the reflection components of the radar wave that conforms to the second transmission signal.

4. The radar apparatus according to claim 1, wherein
the observing means detects a speed of the target on the basis of the peak frequency, together with a distance to the target, as observation values of the target that has generated the reflected waves corresponding to the peak frequency; and
the inhibiting means selectively inhibits the distance from being detected from among the distance to the target and the speed of the target, the distance and the speed corresponding to the peak frequency of which the reflection components have been judged as being the synthetic components by the judging means.

5. The radar apparatus according to claim 4, wherein the apparatus comprises a distance estimating means that estimates a distance to the target which corresponds to the peak frequency and of which the distance has been inhibited by the inhibiting means from being detected, on the basis of the speed of the target that has been detected by the observing means on the basis of the peak frequency, the distances to the target specified in the past for a target that is estimated to be identical with the target.

6. The radar apparatus according to claim 1, wherein
the observing means is configured to detect a speed and an azimuth of the target together with a distance to the target, as the observation values of the target that has generated the reflected waves corresponding to the peak frequency; and
the inhibiting means inhibits all detections of a distance to the target and a speed and an azimuth of the target corresponding to the peak frequency of which the reflection components have been judged as being the synthetic components by the judging means.

7. The radar apparatus according to claim 1, wherein the apparatus comprises communicating means, and that information on a speed of the target detected by the observing means and on a target that is estimated to be identical with the target is transmitted to a control device via the communicating means.

* * * * *